(12) United States Patent
Kwon et al.

(10) Patent No.: US 8,116,245 B2
(45) Date of Patent: Feb. 14, 2012

(54) METHOD AND APPARATUS FOR REDUCING POWER CONSUMPTION OF WIRELESS LAN DEVICE

(75) Inventors: Chang-yeul Kwon, Yongin-si (KR); Chil-youl Yang, Yongin-si (KR); Joong-suk Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 433 days.

(21) Appl. No.: 11/514,953

(22) Filed: Sep. 5, 2006

(65) Prior Publication Data

US 2007/0058575 A1  Mar. 15, 2007

(30) Foreign Application Priority Data

Sep. 2, 2005 (KR) .................. 10-2005-0081810

(51) Int. Cl.
*G08C 17/00* (2006.01)

(52) U.S. Cl. .................. 370/311; 455/550.1; 455/552.1; 455/574; 455/343.2; 455/561; 370/318

(58) Field of Classification Search .................. 455/574, 455/552.1, 127.5, 343.2–343.3; 370/311, 370/318, 389
See application file for complete search history.

(56) References Cited

U.S. PATENT DOCUMENTS

| | | | |
|---|---|---|---|
| 5,355,518 A | 10/1994 | Kindinger et al. | |
| 7,257,095 B2* | 8/2007 | Liu | 370/311 |
| 2002/0022455 A1* | 2/2002 | Salokannel et al. | 455/68 |
| 2004/0110475 A1* | 6/2004 | Korol | 455/126 |
| 2004/0204181 A1* | 10/2004 | Cromer et al. | 455/574 |
| 2004/0259542 A1* | 12/2004 | Viitamaki et al. | 455/426.2 |
| 2005/0025080 A1* | 2/2005 | Liu | 370/311 |
| 2005/0226204 A1* | 10/2005 | Uehara | 370/349 |
| 2005/0239463 A1* | 10/2005 | Lagnado | 455/435.2 |
| 2005/0239491 A1* | 10/2005 | Feder et al. | 455/522 |
| 2006/0146769 A1* | 7/2006 | Patel et al. | 370/338 |
| 2007/0004376 A1* | 1/2007 | Kogure | 455/343.5 |
| 2007/0037548 A1* | 2/2007 | Sammour et al. | 455/343.2 |
| 2007/0047666 A1* | 3/2007 | Trachewsky | 375/267 |
| 2007/0115873 A1* | 5/2007 | Kim et al. | 370/318 |
| 2007/0190964 A1* | 8/2007 | Edwards et al. | 455/343.1 |
| 2007/0238438 A1* | 10/2007 | Alon et al. | 455/343.2 |
| 2007/0238440 A1* | 10/2007 | Sengupta et al. | 455/343.2 |
| 2007/0275669 A1* | 11/2007 | Rietman et al. | 455/70 |

FOREIGN PATENT DOCUMENTS

| | | |
|---|---|---|
| KR | 10-1999-0065379 A | 8/1999 |
| KR | 10-2001-0075670 A | 8/2001 |
| KR | 1020050024760 | 3/2005 |

\* cited by examiner

*Primary Examiner* — Nick Corsaro
*Assistant Examiner* — Babar Sarwar
(74) *Attorney, Agent, or Firm* — Sughrue Mion, PLLC

(57) ABSTRACT

A method and apparatus for reducing the power consumption of a wireless LAN device that operates in a wireless network are disclosed. The method for reducing the power consumption includes receiving a high throughput (HT) frame; judging whether the received HT frame is decodable; and if the received HT frame is not decodable, switching the wireless LAN device into a standby mode, and maintaining the device in the standby mode for a duration of the HT frame.

25 Claims, 12 Drawing Sheets

FIG. 6

| Rate (Mbits/s) | R1-R4 |
|---|---|
| 6 | 1101 |
| 9 | 1111 |
| 12 | 0101 |
| 18 | 0111 |
| 24 | 1001 |
| 36 | 1011 |
| 48 | 0001 |
| 54 | 0011 |

FIG. 7

| MCS Index | Number of Spatial Streams | Modulation | Coding Rate | GI = 800ns | | GI = 400ns | |
|---|---|---|---|---|---|---|---|
| | | | | Transmission Rate at 20 MHz | Transmission Rate at 40 MHz | Transmission Rate at 20 MHz | Transmission Rate at 40 MHz |
| 0 | 1 | BPSK | 1/2 | 6.50 | 13.50 | 7.22 | 15.00 |
| 1 | 1 | QPSK | 1/2 | 13.00 | 27.00 | 14.44 | 30.00 |
| 2 | 1 | QPSK | 3/4 | 19.50 | 40.50 | 21.67 | 45.00 |
| 3 | 1 | 16-QAM | 1/2 | 26.00 | 54.00 | 28.89 | 60.00 |
| 4 | 1 | 16-QAM | 3/4 | 39.00 | 81.00 | 43.33 | 90.00 |
| 5 | 1 | 64-QAM | 2/3 | 52.00 | 108.00 | 57.78 | 120.00 |
| 6 | 1 | 64-QAM | 3/4 | 58.50 | 121.50 | 65.00 | 135.00 |
| 7 | 1 | 64-QAM | 5/6 | 65.00 | 135.00 | 72.22 | 150.00 |
| 8 | 2 | BPSK | 1/2 | 13.00 | 27.00 | 14.44 | 30.00 |
| 9 | 2 | QPSK | 1/2 | 26.00 | 54.00 | 28.89 | 60.00 |
| 10 | 2 | QPSK | 3/4 | 39.00 | 81.00 | 43.33 | 90.00 |
| 11 | 2 | 16-QAM | 1/2 | 52.00 | 108.00 | 57.78 | 120.00 |
| 12 | 2 | 16-QAM | 3/4 | 78.00 | 162.00 | 86.67 | 180.00 |
| 13 | 2 | 64-QAM | 2/3 | 104.52 | 216.00 | 116.13 | 240.00 |
| 14 | 2 | 64-QAM | 3/4 | 117.00 | 243.00 | 130.00 | 270.00 |
| 15 | 2 | 64-QAM | 5/6 | 130.00 | 270.00 | 144.44 | 300.00 |
| ... | ... | ... | ... | ... | ... | ... | ... |
| 31 | 2 | 64-QAM | 5/6 | 130.00 | 270.00 | 144.44 | 300.00 |
| 32 | 2 | 64-QAM | 5/6 | 130.00 | 270.00 | 144.44 | 300.00 |

FIG. 8

| MCS Index | Coding Rate | Stream Modulation | | | | Transmission Rate at 20 MHz | | Transmission Rate at 40 MHz | |
|---|---|---|---|---|---|---|---|---|---|
| | | M0 | M1 | M2 | M3 | Full GI | Half GI | Full GI | Half GI |
| 33 | 3/4 | 256-QAM | OFF | OFF | OFF | 78.00 | 86.67 | 162.00 | 180.00 |
| 34 | 1/2 | 16-QAM | QPSK | OFF | OFF | 52.00 | 57.78 | 108.00 | 120.00 |
| 35 | 1/2 | 64-QAM | QPSK | OFF | OFF | 52.00 | 57.78 | 108.00 | 120.00 |
| 36 | 1/2 | 64-QAM | 16-QAM | OFF | OFF | 65.00 | 72.22 | 135.00 | 150.00 |
| 37 | 3/4 | 16-QAM | QPSK | OFF | OFF | 58.50 | 65.00 | 121.50 | 135.00 |
| 38 | 3/4 | 64-QAM | QPSK | OFF | OFF | 78.00 | 86.67 | 162.00 | 180.00 |
| 39 | 3/4 | 64-QAM | 16-QAM | OFF | OFF | 97.50 | 108.33 | 202.50 | 225.00 |
| 40 | 3/4 | 256-QAM | QPSK | OFF | OFF | 97.50 | 108.33 | 202.50 | 225.00 |
| 41 | 3/4 | 256-QAM | 16-QAM | OFF | OFF | 117.00 | 130.00 | 243.00 | 270.00 |
| 42 | 3/4 | 256-QAM | 64-QAM | OFF | OFF | 136.50 | 151.67 | 283.50 | 315.00 |
| 43 | 3/4 | 256-QAM | 256-QAM | OFF | OFF | 156.00 | 173.33 | 324.00 | 360.00 |
| 44 | 1/2 | 16-QAM | QPSK | QPSK | OFF | 52.00 | 57.78 | 108.00 | 120.00 |
| 45 | 1/2 | 16-QAM | 16-QAM | QPSK | OFF | 65.00 | 72.22 | 135.00 | 150.00 |
| 46 | 1/2 | 64-QAM | QPSK | QPSK | OFF | 65.00 | 72.22 | 135.00 | 150.00 |
| 47 | 1/2 | 64-QAM | 16-QAM | 16-QAM | OFF | 78.00 | 86.67 | 162.00 | 180.00 |
| 48 | 1/2 | 64-QAM | 16-QAM | 16-QAM | OFF | 91.00 | 101.11 | 189.00 | 210.00 |
| 49 | 1/2 | 64-QAM | 64-QAM | QPSK | OFF | 91.00 | 101.11 | 189.00 | 210.00 |
| 50 | 1/2 | 64-QAM | 64-QAM | 16-QAM | OFF | 104.00 | 115.56 | 216.00 | 240.00 |
| ... | ... | ... | ... | | | ... | ... | ... | ... |
| 126 | 3/4 | 256-QAM | 64-QAM | 16-QAM | 16-QAM | 214.50 | 238.33 | 445.50 | 495.00 |

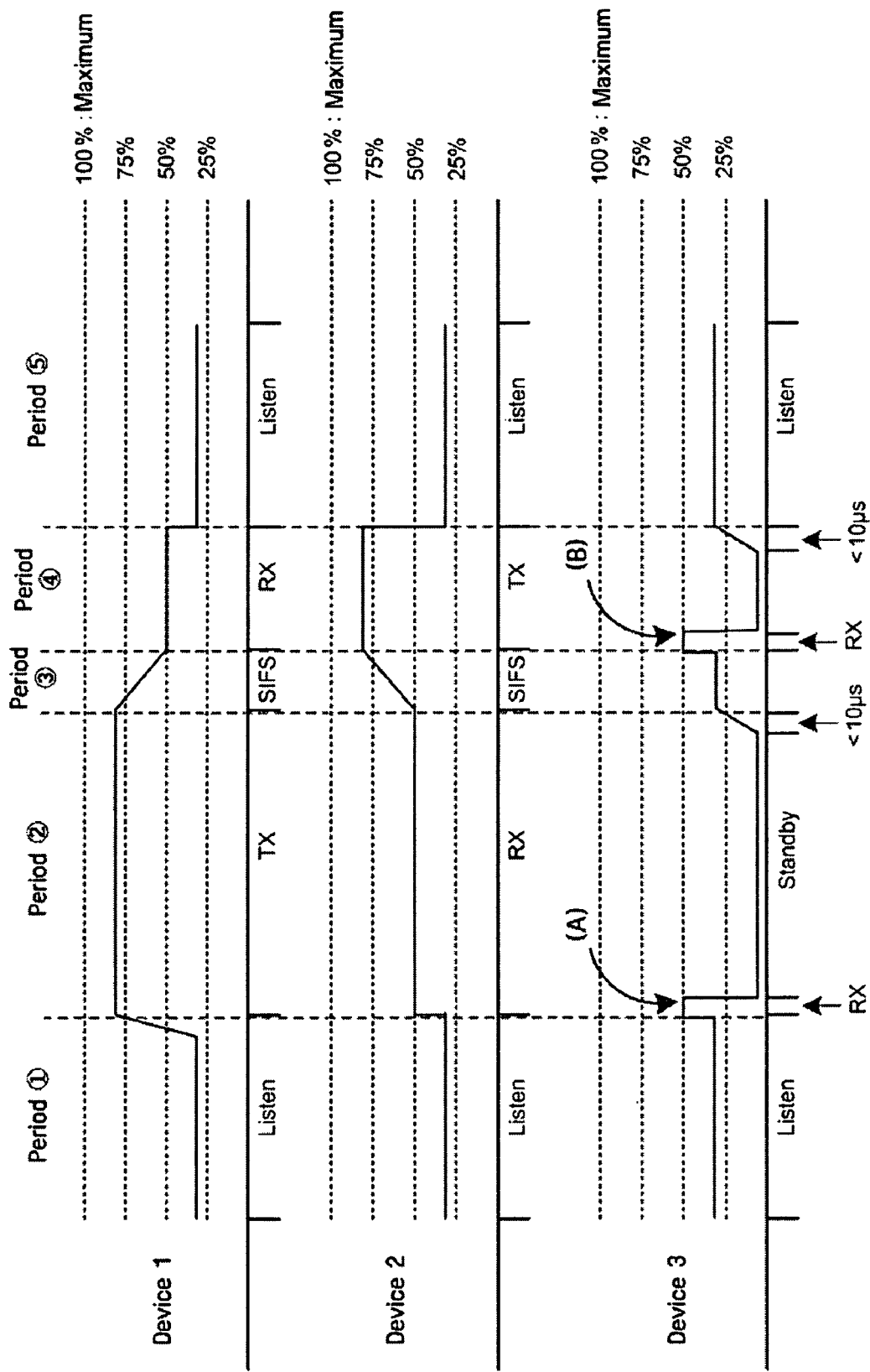

FIG. 10

| Mode | Description | Average Power Consumption (%) |
|---|---|---|
| Tx | Data Transmission | 80% |
| Rx | Data Reception | 50% |
| Listen | Listening through Wireless Medium | 30% |
| Standby | Although wireless medium is disregarded, the current mode can be switched into Tx, Rx or listen mode within a short time (typically shorter than 10 μs). | 5% |
| Sleep | Device is turned off, and more than one ms is required in order to switch the current mode into another mode. | less than 0.1% |

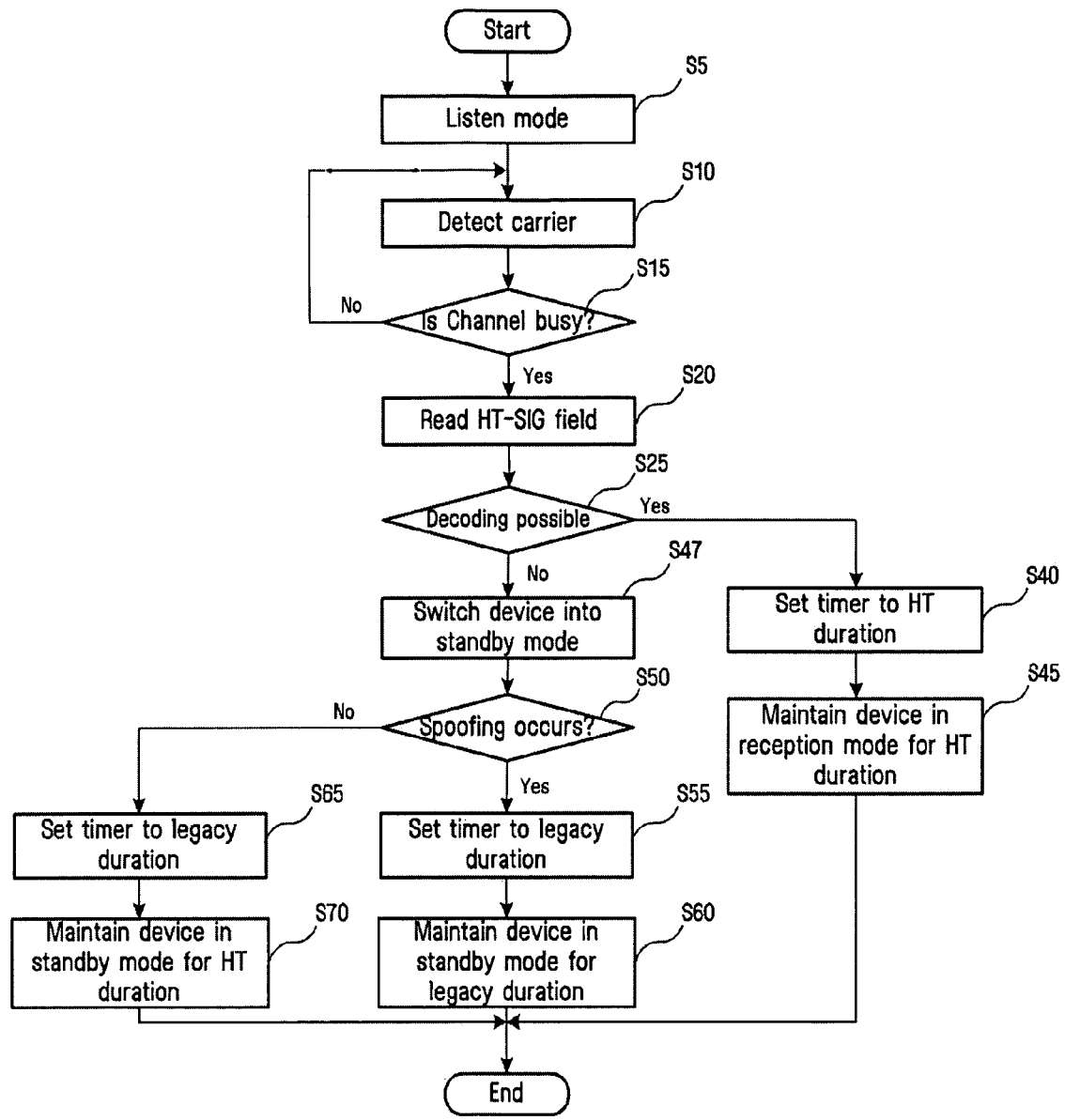

METHOD AND APPARATUS FOR REDUCING POWER CONSUMPTION OF WIRELESS LAN DEVICE

CROSS-REFERENCE TO RELATED APPLICATION

This application is based on and claims priority from Korean Patent Application No. 10-2005-0081810, filed on Sep. 2, 2005 the disclosure of which is incorporated herein in its entirety by reference.

BACKGROUND OF THE INVENTION

1. Field of the Invention

Methods and apparatuses consistent with the present invention relate to a wireless communication technology, and more particularly methods and apparatuses consistent with the present invention reduce power consumption of a wireless LAN device operating in a wireless network.

2. Description of the Related Art

With the development and spread of digital products, corresponding digital technologies require development of high-speed wireless LANs (local area networks) that support a transmission rate of higher than 100 Mbits per second. A multiple-input multiple-output (MIMO) technology is considered to be one of the candidate high-speed technologies of the next-generation wireless LAN that can satisfy the development requirement.

Work is proceeding on the IEEE 802.11n standard which has a purpose of applying a channel bonding technology, among other purposes, which makes it possible to use twice the current maximum bandwidth by using multi-channels together with MIMO technology.

IEEE 802.11n is a standard enabling a transmission speed of at least 100 Mbps at a MAC data service access point (MAC SAP) by changing the existing IEEE 802.11 PHY and MAC. Some schemes of the new standard that support a high-speed transmission speed aim at operating in association with the existing 802.11a or 802.11g wireless LAN systems. In order to achieve frequency efficiency at an unlicensed bandwidth, a practical model that requires the highest transmission support in supporting the transmission speed should attain at least 3 bits/sec/Hz at a PLCP service data unit (PSDU) level.

The currently developing IEEE 802.11n standard seeks to achieve a high data transmission speed at a MAC upper layer, a communication coverage distance, overall network capacity, power consumption, frequency band flexibility, an implementation cost and complexity, a compatibility with the existing wireless LAN standard, and a coexistence with the existing devices.

Products have been released that support these aims using an orthogonal frequency division multiplexing (OFDM) or MIMO technology. It is expected that diverse wireless LAN devices, such as wireless TV sets, wireless set-top boxes, wireless portable devices, wireless notebook computers, and others, will form a network in the unit of a wireless cell.

In order for such diverse wireless LAN devices to operate in a high-speed wireless LAN environment at any time and in any place, a stable power supply is required. Since the wireless LAN devices are portable, in most cases they are not supplied with a stable power like wired devices, and generally operate using compact and light rechargeable batteries.

FIG. 1 is a view illustrating an example of a wireless LAN network composed of a plurality of high throughput devices (HT devices). Referring to FIG. 1, handheld devices 2a and 2a among the HT devices have lower capability than other HT devices 1a, 1b, and 1c, due to the limited number of antennas provided thereto. Accordingly, the handheld device may not decode a certain frame when it communicates with other HT devices.

Nevertheless, the handheld device may operate in a reception mode with respect to the non-decoded frame, and this causes battery-power consumption to be increased. The respective HT devices show a significant difference in power consumption, depending on their operational states (e.g., a transmission mode, reception mode, and standby mode). The HT device consumes a lot of power in the reception mode compared to the transmission mode. Since the battery lifespan of the handheld device is limited, such power consumption causes a serious problem.

The power consumption occurring during the communication between the conventional HT devices will be described in detail with reference to FIGS. 2 and 3. It is assumed that, as shown in FIG. 2, the HT device 1 transmits data to the HT device 2, and receives an acknowledgement (ACK) from the HT device 2. The HT device 1 can transmit the data to the HT device 2 when the DIFS (Distributed coordination function Interframe Space) elapses from the time when a channel enters an idle state (assuming that a backoff timer of the HT device 1 is set to "0"). In this case, both the HT device 2 and the HT device 3 receive the transmitted data because of the nature of wireless communication. Although the target of the data is the HT device 2, the HT device 3 does not know that it should not receive the data until the data is processed in the MAC layer, and thus it continuously receives the data. In the same manner, the HT device 3 also receives the ACK that is transmitted when the SIFS (Short InterFrame Space) elapses after the data transmission is completed. Then, the HT devices can transmit the data after the DIFS in accordance with a backoff algorithm.

FIG. 3 is a view illustrating the power consumed by the respective HT devices during their communication operation as shown in FIG. 2. In the first DIFS period (period ①)), all HT devices are in a listening mode, i.e., a mode for waiting to receive data. Then, while the HT device 1 transmits the data (period ②), the HT device 1 is maintained in a transmission mode (Tx mode), while other HT devices 2 and 3 are maintained in a reception mode (Rx mode).

Then, in an SIFS period (period ③), the HT device 1 reduces its power consumption by switching from Tx mode into Rx mode, while the HT device 2 increases its power consumption by switching from Rx mode into the Tx mode. In the meantime, the HT device 3 is maintained in the listening mode.

While the HT device 2 is in a period of transmitting the ACK (period ④), the HT device 2 is maintained in Tx mode, and other HT devices 1 and 3 are maintained in Rx mode. All HT devices are maintained in the listening mode in DIFS and backoff periods from the time when the channel is in the idle state.

As illustrated in FIGS. 2 and 3, in periods ② and ④, the HT device 3 is maintained in Rx mode, although it does not serve as a receiver. In particular, if the received data is non-decodable data, the HT device has been unnecessarily maintained in Rx mode.

SUMMARY OF THE INVENTION

Accordingly, the present invention has been made to address the above-mentioned problems occurring in the prior art, and an aspect of the present invention is to decrease unnecessary power consumption by efficiently managing the power of a wireless LAN device that operates in a wireless LAN network.

Additional advantages and features of the invention will be set forth in part in the description which follows and in part will become apparent to those having ordinary skill in the art upon examination of the following or may be learned from practice of the invention.

In one aspect of the invention there is provided a method of reducing power consumption of a wireless LAN device, according to the present invention, which comprises receiving a high throughput (HT) frame, judging whether the received HT frame is decodable, and if the received HT frame is not decodable, switching the wireless LAN device into a standby mode, and maintaining the device in the standby mode for the duration of the HT frame.

In another aspect of the present invention, there is provided a method of reducing power consumption of a wireless LAN device, which includes receiving a high throughput (HT) frame, judging whether the received HT frame is decodable, if the received HT frame is not decodable, judging whether spoofing of the HT frame has occurred, and if it is judged that spoofing has occurred, switching the wireless LAN device into a standby mode, and maintaining the device in the standby mode for a legacy duration.

In still another aspect of the present invention, there is provided a wireless LAN device, which includes an RF unit receiving a high throughput (HT) frame, a decoding judgment unit judging whether the received HT frame is decodable, a mode switching unit switching the wireless LAN device into a standby mode if the received HT frame is not decodable, and maintaining the device in the standby mode for the duration of the HT frame, and a power source supplying a corresponding power depending on a mode of the mode switching unit.

In a further aspect of the present invention, there is provided a wireless LAN device, which includes an RF unit for receiving a high throughput (HT) frame, a decoding judgment unit judging whether the received HT frame is decodable, a mode switching unit judging whether a spoofing occurs in the HT frame if the received HT frame is not decodable, and if it is judged that spoofing has occurred, switching the wireless LAN device into a standby mode and maintaining the device in the standby mode for a legacy duration, and a power source supplying a corresponding power depending on a mode of the mode switching unit.

BRIEF DESCRIPTION OF THE DRAWINGS

The above and other aspects, features and advantages of the present invention will become apparent from the following detailed description taken in conjunction with the accompanying drawings, in which:

FIG. 6 is a view illustrating transmission rates of a legacy device and values recorded in a RATE field accordingly;

FIG. 7 is a table showing 33 mandatory MCS indexes prescribed in the TGnSync Alliance, and the transmission characteristics thereof;

FIG. 8 is a table showing extended MCS indexes optionally prescribed by the TGnSync Alliance and the transmission characteristics thereof;

FIG. 9 is a view explaining the concept of a power reduction method according to a first exemplary embodiment of the present invention;

FIG. 10 is a view illustrating the average power required for each mode of respective general wireless LAN devices;

FIG. 14 is a flowchart illustrating a method of reducing power consumption of a wireless LAN device according to the second exemplary embodiment of the present invention.

DETAILED DESCRIPTION OF EXEMPLARY EMBODIMENTS

Figure 1:
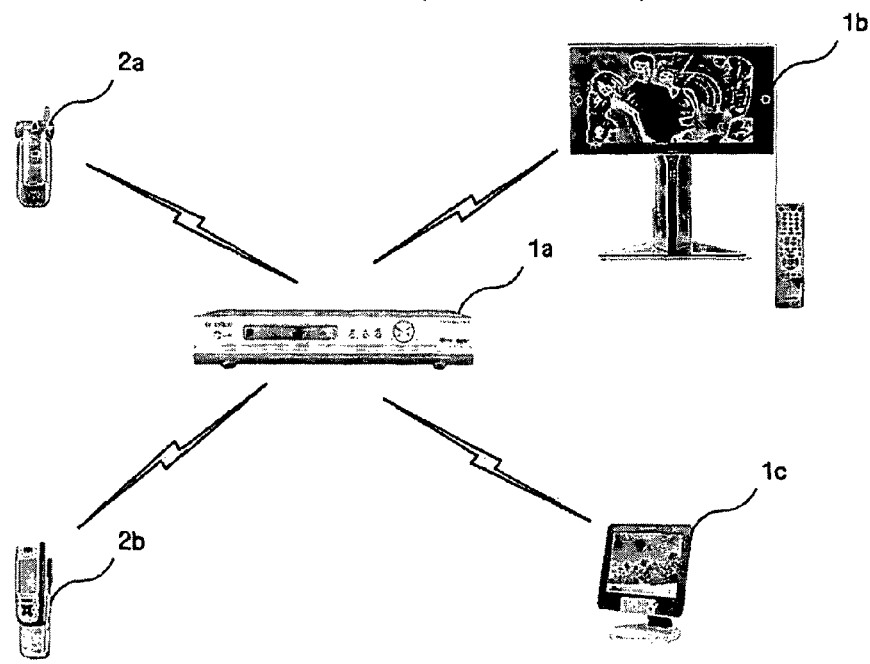
FIG. 1 is a view illustrating an example of a wireless LAN network composed of a plurality of high throughput devices.
Figure 2:
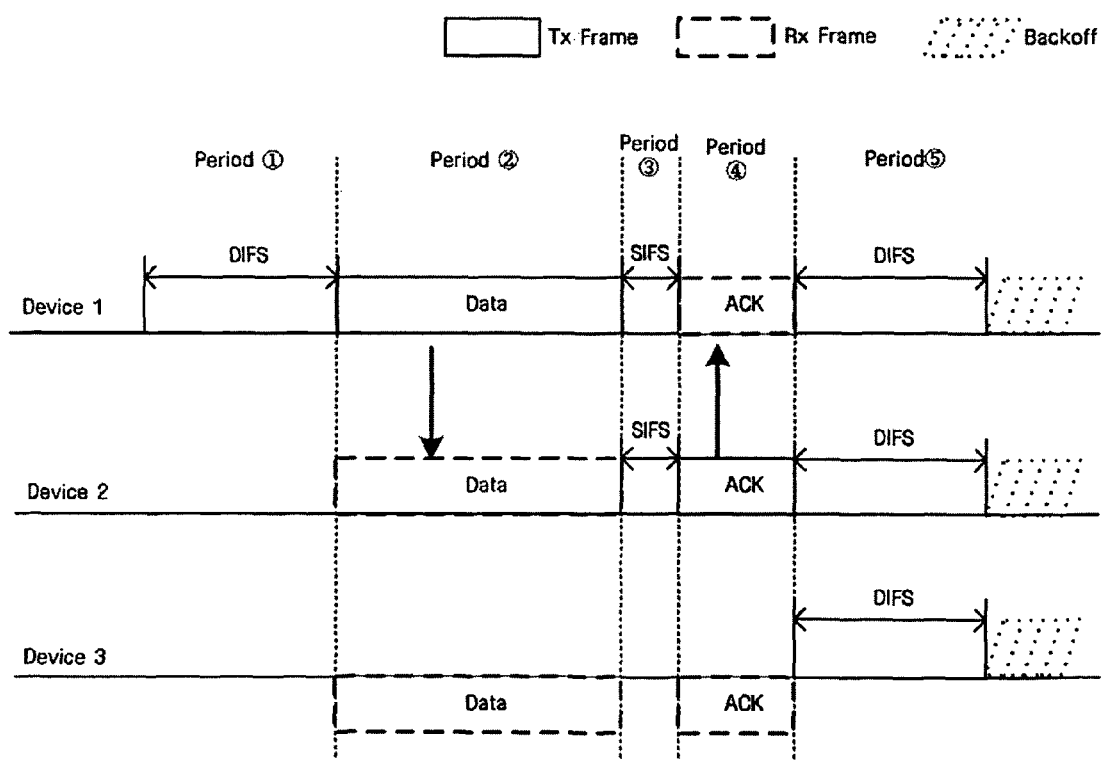
FIG. 2 is a view illustrating an example of transmitting data between wireless LAN devices on a wireless LAN network.

Hereinafter, exemplary embodiments of the present invention will be described in detail with reference to the accompanying drawings. The aspects and features of the present invention and methods for achieving the aspects and features will become apparent by referring to the embodiments to be described in detail with reference to the accompanying drawings. However, the present invention is not limited to the embodiments disclosed hereinafter, but will be implemented in diverse forms. The matters defined in the description, such as the detailed construction and elements, are merely provided to assist those of ordinary skill in the art in a comprehensive understanding of the invention, and the present invention is only defined within the scope of the appended claims. In the entire description of the present invention, the same drawing reference numerals are used for the same elements across various figures.

Figure 4:
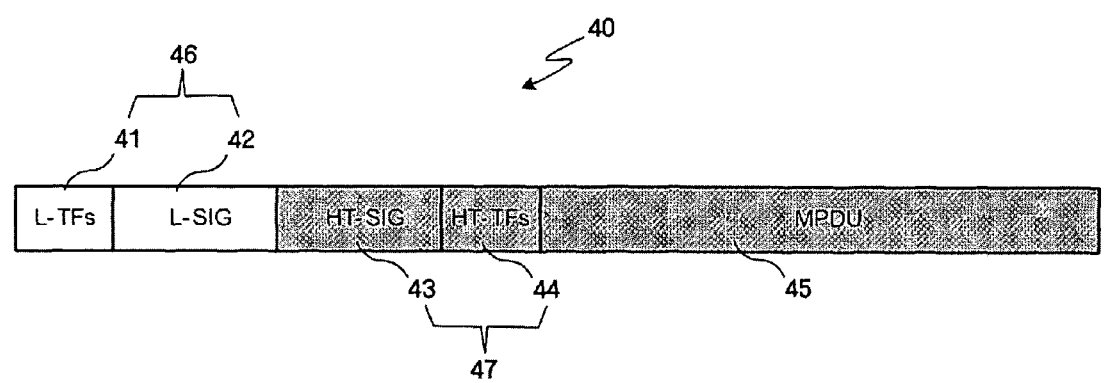
FIG. 4 is a view illustrating the structure of an HT frame according to a TGnSync Alliance standard.

FIG. 4 is a view illustrating the structure of an HT (high throughput) frame 40 according to the TGnSync Alliance standard. The HT frame 40 includes a legacy header 46 composed of legacy training fields (L-TFs) 41 and a legacy signal field (L-SIG field) 42, an HT header 47 composed of an HT signal field (HT-SIG field) 43, HT training fields (FT-TFs) 44, and a MAC protocol data unit (MPDU) 45.

The legacy header 46 can be decoded by a legacy device and an HT device, and the HT header 47 can be decoded by the HT device only. The term legacy device means a wireless LAN device following the IEEE 802.11 standard prior to the IEEE 802.11n standard, while the term HT device means a wireless LAN device following the IEEE 802.11n standard.

Accordingly, the reason why the legacy header 46 positioned in front of the HT header 47 is still prescribed in the TGnSync Alliance standard is that a wireless LAN network in which the HT devices and the legacy devices coexist is considered. That is, the legacy device will recognize the portion exempting the legacy header 46 as an MPDU.

Figure 5:
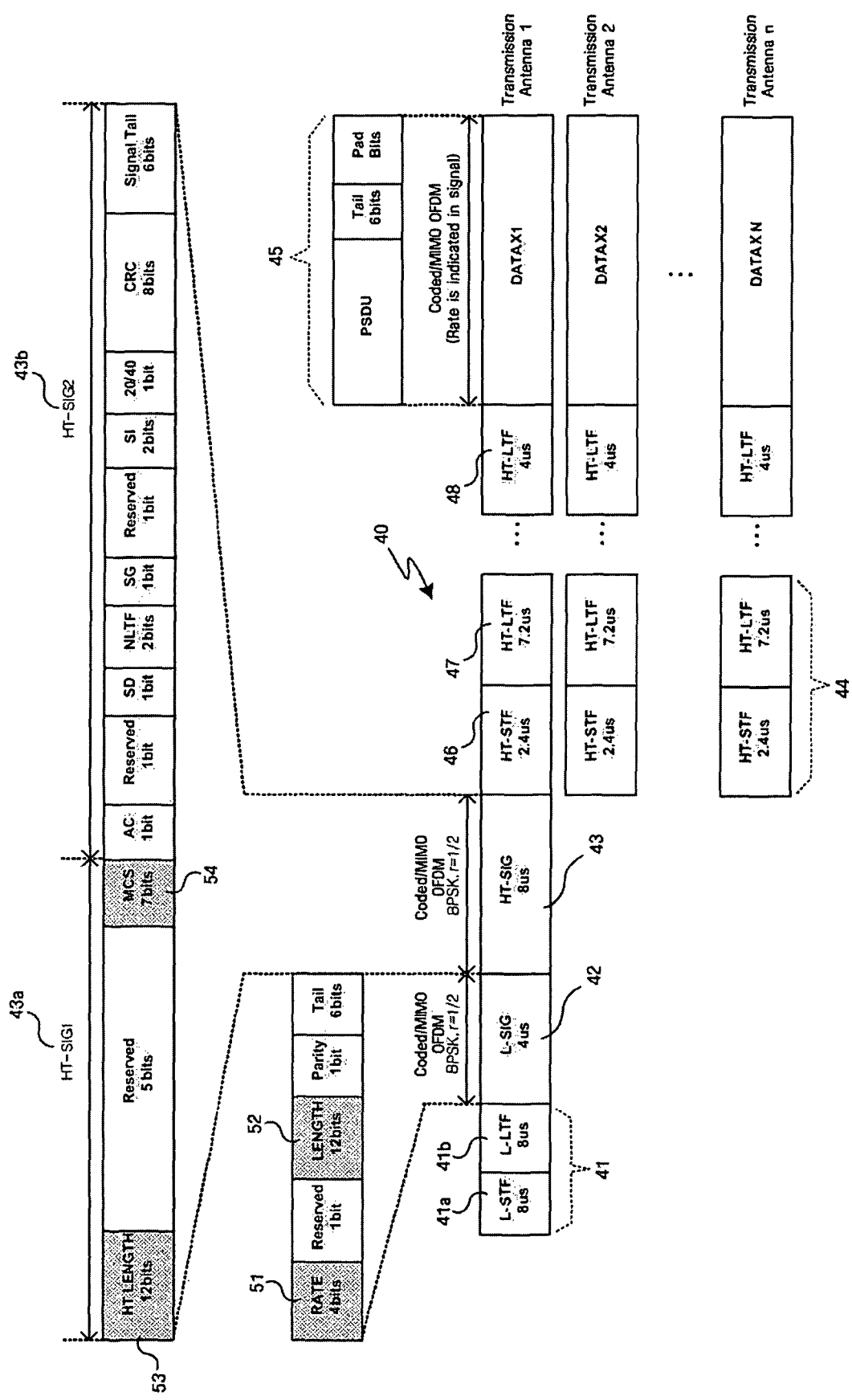
FIG. 5 is a view illustrating the structure of the HT frame in FIG. 4 in more detail.

FIG. 5 is a view illustrating the structure of the HT frame 40 of FIG. 4 in more detail.

The L-TFs 41 may be divided into legacy short training fields 41a and legacy long training fields 41b. The L-SIG field 42 and the HT-SIG field 43 are also subdivided. The HT-TFs 44 is divided into an HT training field (HT-STF) 46 and a plurality of HT long training fields (HT-LTFs) 47 and 48. A plurality of HT-STFs 46, HT-LTFs 47 and 48, and MPDUs 45 may exist depending on the number N of transmission antennas.

The L-SIG field 42 includes a 4 bit RATE field 51, a 12 bit LENGTH field 52, a one bit Parity field, a 6 bit Tail field, and a one bit Reserved field. The HT-SIG field 43 may be divided into an HT-SIG1 43a and an HT-SIG2 43b. The HT-SIG1 43a includes a 12 bit HT LENGTH field 53, a 7 bit MCS field 54, and a 5 bit Reserved field.

In the present invention, the RATE field 51 and the LENGTH field 52 of the L-SIG field 42, and the HT LENGTH field 53 and the MCS field 54 of the HT-SIG 43 field are particularly used.

In the RATE field 51, a transmission rate of the legacy device is written, as shown in FIG. 6.

Referring to FIG. 6, eight transmission rates for the legacy device are indicated as combinations of four bits. The HT device is not particular about the transmission rate. However, its transmission method is determined by a transmission rate, a modulation type, or the number of antennas, which are recorded in the MCS field 54.

In the LENGTH field 52, MAC data to be transmitted, i.e., the size of the MPDU, is recorded. The duration of the MPDU can be known by dividing the size recorded in the LENGTH field 52 by the transmission rate recorded in the RATE field 51.

Actually, when a certain HT device intends to transmit a HT frame 40 to other HT devices in a wireless LAN network on which legacy devices and HT devices coexist, the size value recorded in the LENGTH field 52 is set to be higher than the size of the HT frame 40 to be actually transmitted, so that the legacy devices may be intentionally prevented from edging into the transmission operation. This intentional excluding of the legacy devices is called a spoofing or an extended PHY protection (EPP). Accordingly, the HT device can transmit/receive plural data and block ACKs (BAs) during the spoofing period, without any interruption of other legacy devices. In the legacy LENGTH field 52, less than 2346 bytes should be recorded in order to prevent misinterpreting of the legacy devices exiting in the network.

In the HT LENGTH field 53, the actual size of the MPDU 45 is recorded. Also, in the MCS field 54, an MCS index for determining the number of antennas (i.e., the number of spatial streams), a modulation method, a coding rate, and a transmission rate of the HT frame 40 (hereinafter referred to as "transmission characteristics") are recorded. Binary phase shift keying (BPSK), quadrature amplitude modulation (QPSK), and 16-quadrature amplitude modulation (64-QAM) may be used as the modulation method. The transmission rate may be varied depending on the size of a guard interval (GI).

Accordingly, the above-described information may be obtained by decoding the MCS indexes.

The MCS field 54 is composed of 7 bits, and 128 ($0^{th}$ through $127^{th}$) MCS indexes can be discriminately recorded at maximum. FIG. 7 illustrates a table in which 33 ($0^{th}$ through $32^{nd}$) mandatory MCS indexes prescribed in the TGnSync Alliance and the transmission characteristics thereof are described. Even in the case of plural (two) antennas, the same modulation method is used for the respective antennas.

By contrast, the extended MCS optionally prescribed in the TGnSync Alliance is described in FIG. 8. In FIG. 8, 94 MCS indexes ($33^{rd}$ through $126^{th}$) are shown, and different modulation methods are utilized depending on the number of the antennas (M0 through M3).

Figure 3:
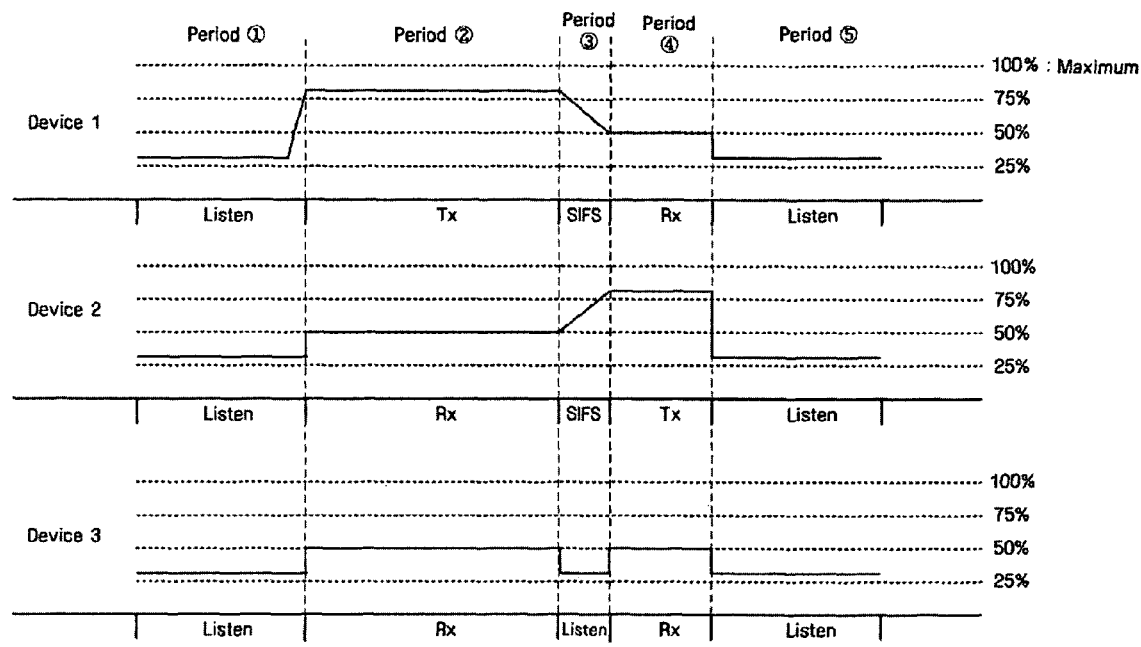
FIG. 3 is a view illustrating the power consumed by the respective wireless LAN devices of FIG. 2.

FIG. 9 is a view explaining the concept of a power reduction method according to a first embodiment of the present invention. In the same manner as in FIG. 3, it is assumed that the HT device 1 transmits data, i.e., HT frames, to the HT device 2 as shown in FIG. 3. The HT device 1 is in a listen mode at an early stage of a period ①, and is switched into a transmission mode (Tx mode) at a late stage thereof. The HT device 1 transmits the HT frames to the HT device 2 through a wireless medium in a period ②. If the transmission of the HT frames is completed, the HT device 1 reduces its power by switching from the Tx mode into the Rx mode during a SIFS (period ③). Then, the HT device 2 receives an ACK that is transmitted from the HT device 2 in a period ④. If the reception of ACK is completed, the HT device 1 is switched into the listen mode (period ⑤).

If the HT device 2 judges that the channel is busy by detecting the existence/nonexistence of a carrier at any time in a state that it is in the listen mode during the period ①, it switches the present mode into the reception mode by increasing the power, and maintains the reception mode until the transmission of the HT frame is completed (e.g., in the period ②). Then, during the SIFS (period ③), the HT device 2 switches the present mode into Tx mode by increasing the power, and transmits the ACK to the HT device 1 (period ④). If the reception of the ACK is completed, the HT device 1 is switched into the listen mode (period ⑤).

The HT device 3 also receives the HT frame transmitted by the HT device 1 according to the characteristics of the wireless network. If the HT device 3 judges that the channel is busy by detecting the existence/nonexistence of a carrier at any time in a state that it is in the listen mode during the period ①, it switches the present mode into the reception mode by increasing the power, and parses the L-TFs 41, the L-SIG field 42, and the HT-SIG field 43 of the HT frame in order. In this case, the HT device reads the HT LENGTH field 53 and the MCS field 54 included in the HT-SIG field 42. A legend "A" in FIG. 9 indicates the period in which the HT device 3 is switched into the reception mode to read the fields 41, 42, and 43.

The HT device 3 judges whether the HT device itself supports the transmission characteristic that is indicated by the MCS index recorded in the MCS field 52, i.e., whether the data decoding is possible. For example, if more than 8 MCS indexes are recorded on the assumption that the HT device 3 is a handheld device having only one antenna, it is impossible to decode the HT frame regardless of whether the destination of the HT frame is the HT device 3. That is, the HT device 3 has no possibility of transmitting or receiving the data for the duration of the HT frame at least. Accordingly, after the HT device 3 passes the period A, i.e., the HT device 3 reads only the fields 41, 42, and 43, it is switched into the standby mode for the duration. The duration is calculated by dividing the size value recorded in the HT LENGTH field 53 by the transmission rate indicated by the MCS index. Of course, if the size value is recorded in units of bytes and the unit of transmission rate is Mbps, the result of division should be further multiplied by 8.

The HT device 3 increases the power for a specified time period before the expiration of the duration, and is again switched into the listen mode. The HT device 3 is maintained in the listen mode in the period ③ (SIFS), and when the HT device 2 starts to transmit the ACK to the HT device 1, the HT device 3 reads the L-TFs 41, the L-SIG field 42, and the HT-SIG field 43 of the ACK (period B) to determine whether the ACK is decodable. If the ACK is not decodable, the HT device is switched into the standby mode for the duration of the ACK. Then the HT device 3 increases the power for the specified time period before the expiration of the duration, and is switched again into the listen mode.

FIG. 10 is a view illustrating an average power required for respective modes of general wireless LAN devices. On the assumption that the maximum power required for the wireless LAN device is 100%, the wireless LAN device consumes about 80% of the power for a transmission mode, about 50% of the power for a reception mode, and about 30% of the power for a listen mode, respectively. Since the signal received through a wireless medium is disregarded in the case where the wireless LAN device is in a standby mode, the device consumes only about 5% power, which is much smaller than the power consumption for other modes. In the standby mode, the wireless LAN device can be switched into any of the modes within 10 μs, if necessary. In the case where the wireless LAN device is in a sleep mode, the power consumption is very low, for example, below 0.1% of the power. However, since more than 1 ms is required for the switchover from the sleep mode to another mode, it is not suitable for the present invention.

Figure 11:
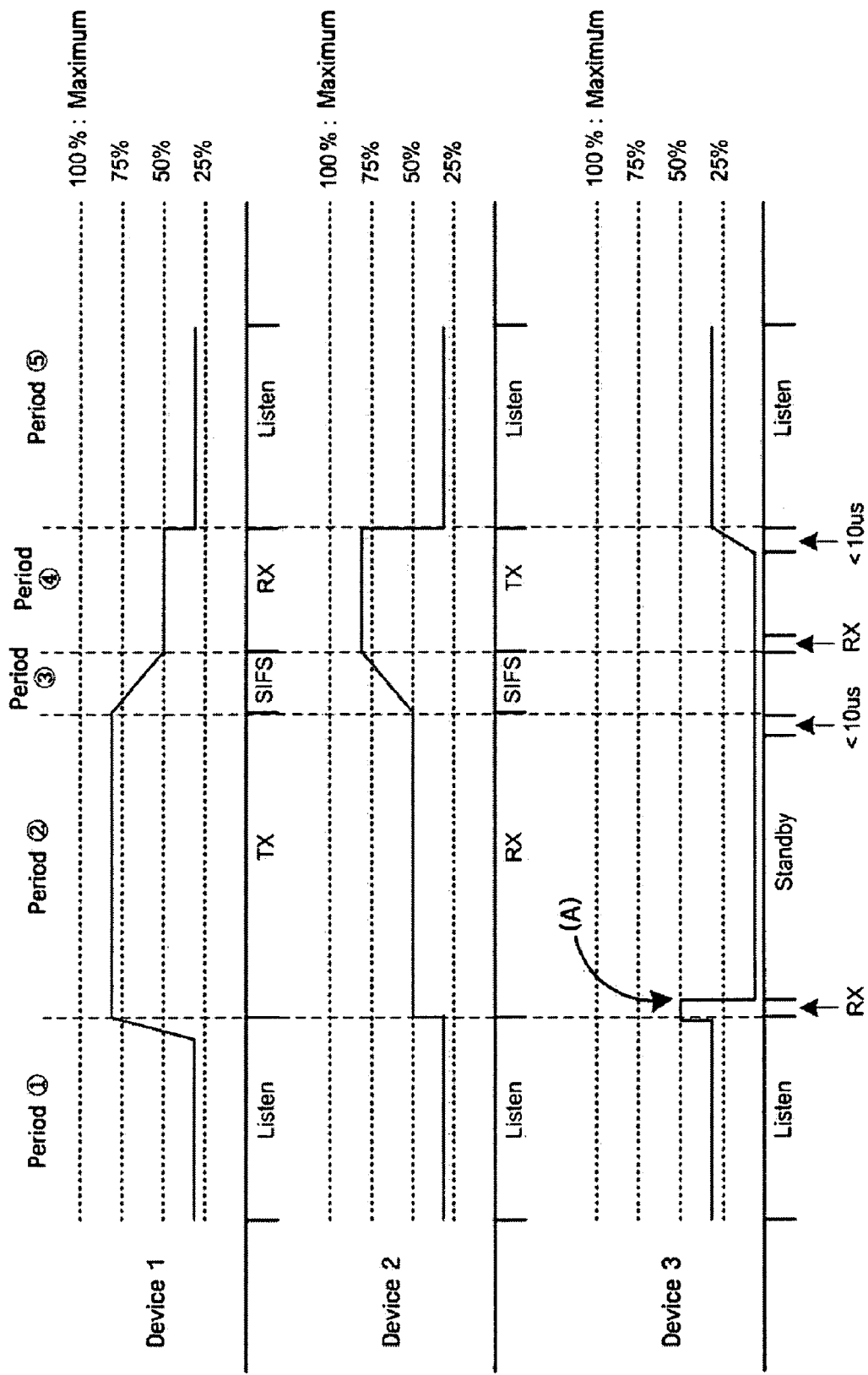
FIG. 11 is a view explaining the concept of a power reduction method according to a second exemplary embodiment of the present invention.

FIG. 11 is a view explaining the concept of a power reduction method according to a second embodiment of the present invention.

In FIG. 9, only the HT LENGTH field 53 and the MCS field 54 are used to determine the mode switching of the HT device 3. In this embodiment, however, the RATE field 51 and the LENGTH field 52 contained in the L-SIG field 42 are also used.

In this embodiment, the HT device 3 first judges whether the HT frame transmitted from the HT device 1 is decodable through the MCS field 54, and if the HT frame is decodable, the HT device 3 judges whether spoofing occurs. Whether spoofing occurs is judged by the difference between the legacy duration and the HT duration. In general, if spoofing occurs, the legacy duration is longer than the HT duration.

The legacy duration is calculated by dividing the size recorded in the LENGTH field 52 by the transmission rate recorded in the RATE field 51, and the HT duration is calculated by dividing the size recorded in the HT LENGTH field 53 by the transmission rate indicated by the MCS index recorded in the MCS field 54.

In FIG. 11, if it is assumed that the legacy duration is set as the sum of the transmission time of the HT frame, the SIFS, and the transmission time of the ACK, the HT device is temporarily in the reception mode during the period A, and is maintained in the standby mode during the legacy duration, which can further reduce the power in comparison to the embodiment shown in FIG. 9.

If spoofing has not occurred, the HT device 3 is switched into the standby mode only for the HT duration (that is identical to the legacy duration) as illustrated in FIG. 9, so that the power is saved.

The HT device 1 may set the time needed to transmit/receive more data to/from the HT device 2 as the legacy duration of the HT frame. Accordingly, other legacy devices may be intentionally prevented from edging into the transmission operation during the time. Also, other HT devices that cannot decode the HT frame operate like the legacy devices for the legacy duration, and are switched into the standby mode, so that the power consumption is reduced.

In the embodiments as shown in FIGS. 9 and 11, the HT device 3 may read the entire HT-SIG field 43. However, since information to be used in the HT-SIG field 43 is only the HT LENGTH field 53 and the MCS field 54, the HT device 3 may read only the HT-SIG1 (e.g., 43a in FIG. 5) among the HT-SIG field 43.

A method of notifying the HT device having a single antenna not to receive the HT frame 40 using specified bits of the PHY header of the HT frame 40, or a method of notifying whether spoofing occurs using other bits of the PHY header may be considered.

Figure 12:
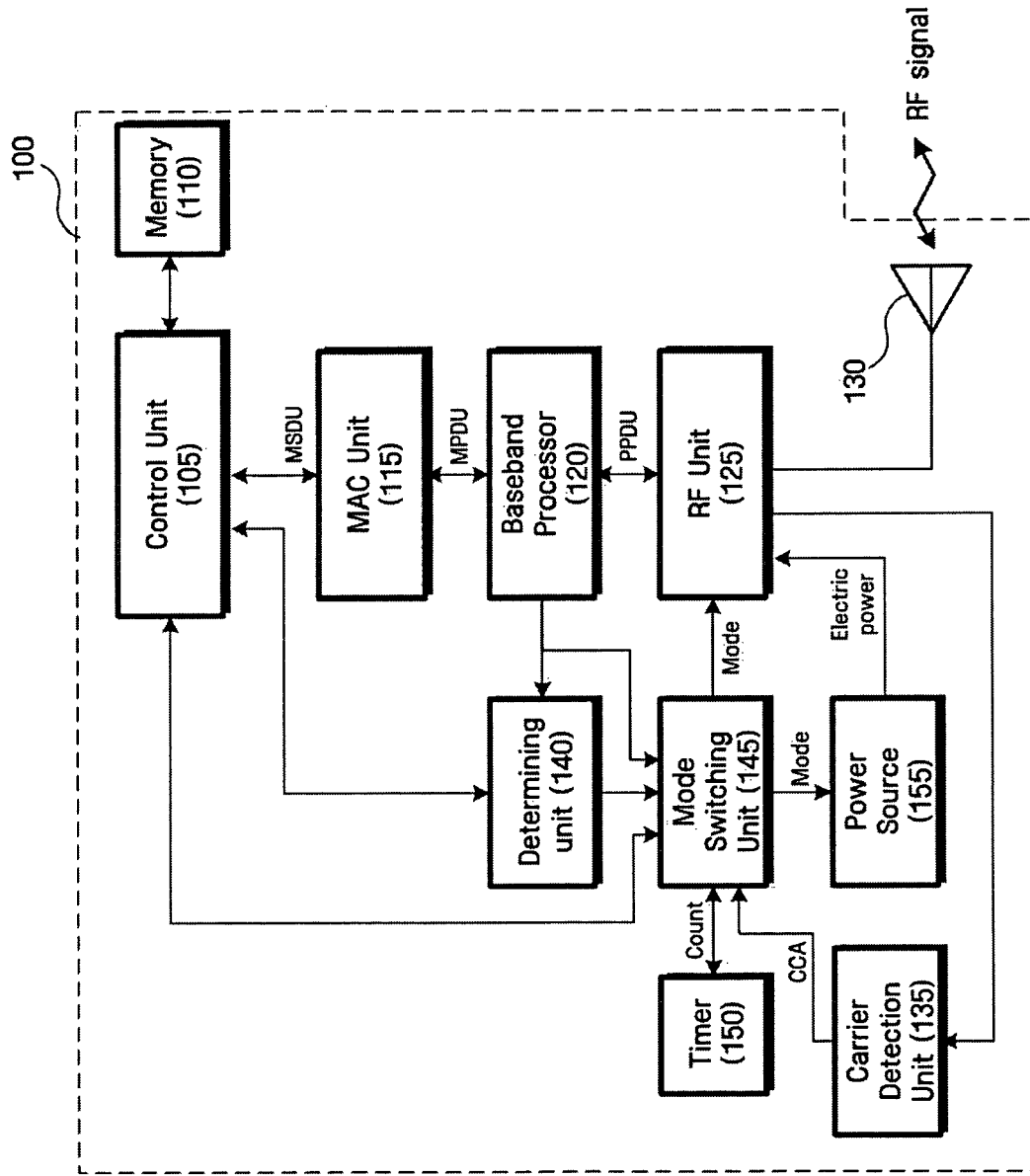
FIG. 12 is a block diagram illustrating the construction of a wireless LAN device according an exemplary embodiment of the present invention.

FIG. 12 is a block diagram illustrating the construction of a wireless LAN device 100 according to an embodiment of the present invention. The wireless LAN device 100 includes an HT device that operates according to the IEEE 802.11n standard.

A control unit 105 controls other constituent elements in the wireless LAN device 100, and operates on a layer having a level that is higher than the MAC layer. The control unit 105 executes a specified application to generate and provide a MAC service data unit (MSDU) to a MAC unit 115, or receives the MSDU from the MAC unit 115.

A memory 110 is loaded with data or an application under the control of the control unit 105, and provides the data or application according to the request of the control unit 105.

The MAC unit 115 adds a MAC header to the provided MSDU to generate a MAC protocol data unit (MPDU), and removes the MAC header from the MPDU provided by a baseband processor 120 to output the MPDU to the control unit 105.

A baseband processor 120 adds a PHY header to the MPDU provided by the MAC unit 115 to generate the PPDU as shown in FIG. 4, and reads and removes the PHY header from the PPDU provided by an RF unit 125 to output the PPDU to the MAC unit 115. The PHY header includes an L-TFs 41, an L-SIG field 42, an HT-SIG field 43, and an HT-TFs 44, as shown in FIG. 4. The L-SIG field 42 includes the RATE field 51 and the LENGTH field 52, and the HT-SIG field 43 includes the HT LENGTH field 53 and the MCS field 54.

The RF unit 125 modulates the PPDU by an adaptive modulation method such as BPSK, QPSK, 16-QAM, 64-QAM, and others, and transmits an RF signal in the air through an antenna 130. Also, the RF unit 125 demodulates the RF signal received through the antenna 130 by a demodulation method that corresponds to the modulation method of the RF signal to output the demodulated signal to the baseband processor 120. The RF unit 125 receives an input of a set current mode from a mode switching unit 145 and the power corresponding to the mode from a power source 155, and performs a transmission/reception of the RF signal, or performs a switchover to a listen mode, a standby mode, or a sleep mode.

A carrier detection unit 135 detects an intensity of the RF signal received from the RF unit 125 at any time to judge whether the current wireless medium is busy or idle, and notifies the mode switching unit 145 of the result of judgment as a value of clear channel assessment (CCA).

A decoding determining unit 140 judges whether the wireless LAN device 100 can decode the MPDU contained in the current PPDU through the MCS field 54 read by the baseband processor 120, that is, whether the wireless LAN device 100 supports the transmission characteristic indicated by the MCS index recorded in the MCS field 52. As a result, one bit flag can be transferred to the mode switching unit 145. For example, if the value is "1", the MPDU can be decoded, whereas if the value is "0", the MPDU cannot be decoded.

The mode switching unit 145 is maintained in the listen mode While the channel is in the idle state, and is switched into the reception mode at a moment when the value of the CCA transferred from the carrier detection unit 135 indicates that the current wireless device is busy. In accordance with the switched reception mode, the RF unit 125 starts to receive the RF signal. If the flag provided by the decoding determining unit 140 is "1", the mode switching unit 145 calculates the HT duration from the HT LENGTH field 53 and the MCS field 54 read by the baseband processor 120, and sets the calculated HT duration through a timer 150. The mode switching unit 145 is maintained in the reception mode until the counted value provided by the timer 150 becomes "0".

If the provided flag is "0", the power source 155 and the RF unit 125 are requested to be switched into the standby mode. After the mode switching unit 145 calculates the HT duration and sets the calculated HT duration through the timer 150, the mode switching unit 145 is maintained in the reception mode until the count value provided by the timer 150 becomes "0".

According to the second embodiment of the present invention, if the flag value is "1", the decoding determining unit 140 judges whether spoofing occurs. Whether spoofing occurs can be judged by the difference between the legacy duration and the HT duration. The legacy duration is calculated by dividing the size recorded in the LENGTH field 52 by the transmission rate recorded in the RATE field 51, and the HT duration is calculated by dividing the size recorded in the HT LENGTH field 53 by the transmission rate indicated by the MCS index recorded in the MCS field 54.

If it is judged that spoofing occurs, the decoding determining unit 140 requests the power source 155 and the RF unit 125 to switch into the standby mode. Further, the decoding determining unit 140 sets the legacy duration through the timer 150, and is maintained in the standby mode until the count value provided by the timer 150 becomes "0". If spoofing does not occur, the decoding determining unit 140 sets the HT duration through the timer 150, in the same manner as the first embodiment, and the decoding judgment unit 140 is maintained in the standby mode until the count value provided by the timer 150 becomes "0".

The power source 155 supplies the required power to the RF unit 125 according to the mode provided by the mode switching unit 145. Examples of the power according the respective modes are shown in FIG. 10.

The constituent elements of the wireless LAN device 100 as shown in FIG. 12 may be embodied by a general processor designed to execute the functions described herein, a digital signal processor (DSP), an application specific integrated circuit (ASIC), a field programmable gate array (FPGA) or other programmable logic devices, or a combination thereof. Although the general processor may be a microprocessor, it may selectively be a conventional controller, a microcontroller, or a state machine. The processor may be embodied by a combination of computing devices, for example, a combination of a DSP and a microprocessor, plural microprocessors, at least one microprocessor associated with a DSP core, or other construction.

Figure 13:
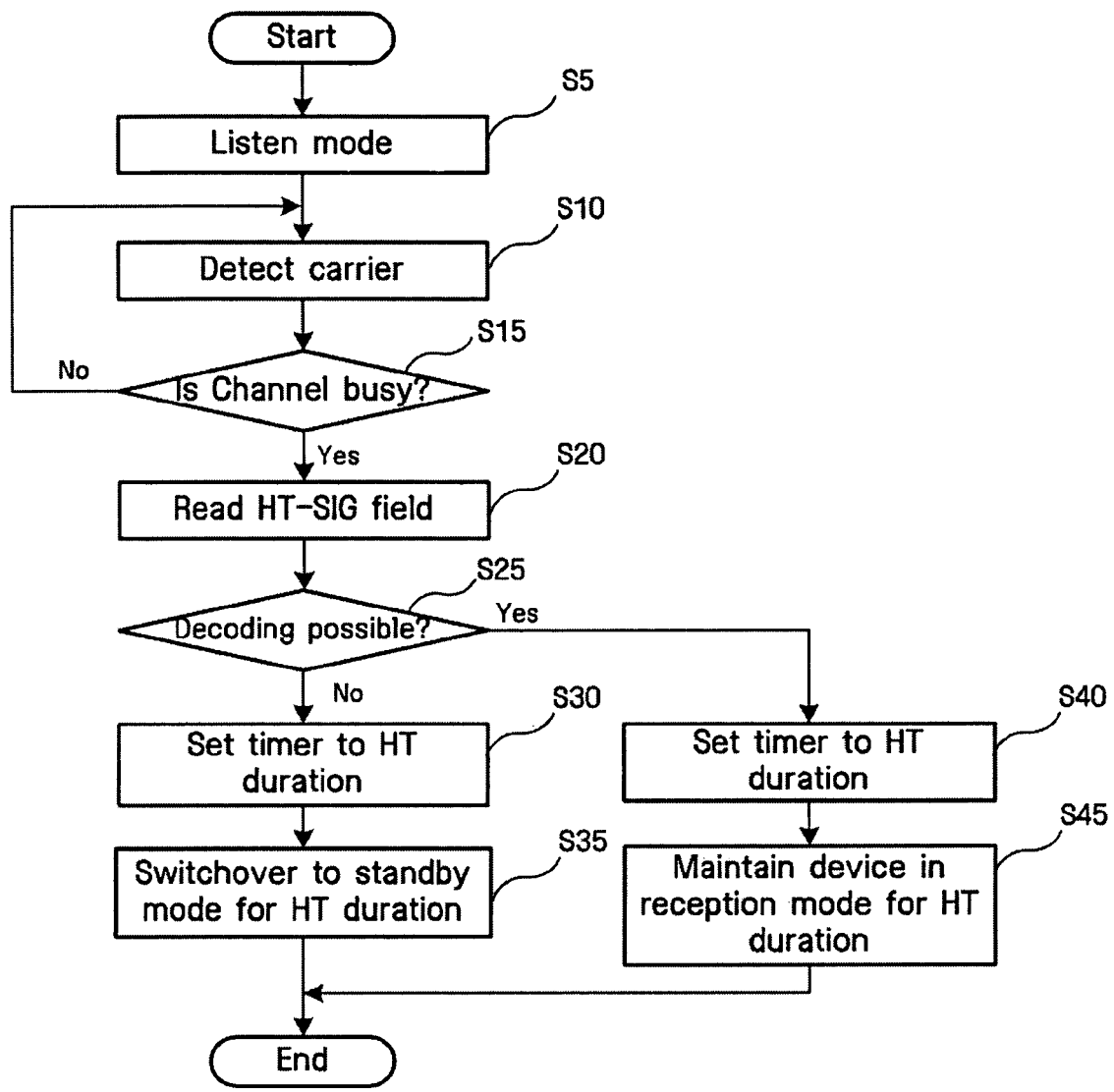
FIG. 13 is a flowchart illustrating a method of reducing power consumption of a wireless LAN device according to the first exemplary embodiment of the present invention.

FIG. 13 is a flowchart illustrating a method of reducing power consumption of a wireless LAN device 100 according to a first embodiment of the present invention. If the wireless medium is in an idle state, the mode switching unit 145 switches the wireless LAN devices 100 into a listen mode (S5). The carrier detection unit 135 detects the carrier of the RF signal (S10). If the wireless medium is busy (YES in operation S15), the mode switching unit 145 switches the current mode into the reception mode, and thus the RF unit 125 provides the baseband processor 120 with the PPDU restored from the RF signal. The baseband processor 120 reads the HT-SIG field 43 (S20).

The decoding determining unit 140 judges whether the wireless LAN device 100 supports the transmission characteristic indicated by the MCS index recorded in the MCS field 54 that is contained in the HT-SIG field 43, i.e., whether the decoding is possible, (S25).

As a result, if the decoding is possible (YES in operation S25), the mode switching unit 145 calculates the HT duration by dividing the size recorded in the HT LENGTH field 53 contained in the HT-SIG field 43 by the transmission rate indicated by the MCS index recorded in the MCS field 54, and sets the timer 150 to the HT duration (S40). Then, the mode switching unit 145 is maintained in the current reception mode until the counted value of the timer 150 becomes "0" (S45).

By contrast, if the decoding is not possible (NO in operation S25), the mode switching unit 145 switches the current reception mode into the standby mode, and thus, the power source 155 reduces the power so that the current power becomes the power of the standby mode. In detail, the mode switching unit 145 calculates the HT duration by dividing the value that is recorded in the HT LENGTH field 53 contained in the HT-SIG field 43 by the transmission rate that is indicated by the MCS index recorded in the MCS field 54, and sets the timer 150 to the HT duration (S30). Then, the mode switching unit 145 switches the current reception mode into the standby mode and maintain in the standby mode until the counted value of the timer 150 becomes "0" (S35).

FIG. 14 is a flowchart illustrating a method of reducing power consumption of a wireless LAN device 100 according to a second embodiment of the present invention. Operations S5 through S25, S40, and S45 are identical to those as shown in FIG. 13, and the detailed explanation thereof will be omitted.

If the decoding is not possible as the result of judgment in operation S25, the mode switching unit 145 is switched into the standby mode (S47). Accordingly, the power source 155 reduces the power so that the current power becomes the power of the standby mode.

Then, the mode switching unit 145 judges whether spoofing occurs (S50). If spoofing occurs (YES in operation S50), the mode switching unit 145 sets the timer to the legacy duration (S55), and maintains the current standby mode until the counted value of the timer 150 becomes "0" (S60).

If spoofing does not occur (NO in operation S50), the mode switching unit 145 sets the timer to the HT duration (S65), and maintains the current standby mode until the counted value of the timer 150 becomes "0" (S70).

As described above, an aspect of the present invention can minimize the power consumption of a handheld device and a device using a battery to increase an operational time of the battery.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of reducing power consumption of a wireless local area network (LAN) device complying with the IEEE 802.1 in standard, the method comprising:
   (a) receiving at the wireless LAN device a high throughput (HT) frame complying with a TGnSync Alliance standard while the wireless LAN device is in a reception mode;
   (b) judging whether the received HT frame is decodable by the wireless LAN device based on whether the wireless LAN device supports at least one transmission characteristic of the HT frame;

(c) if it is judged that the received HT frame is not decodable by the wireless LAN device, switching the wireless LAN device into a standby mode from the reception mode, and maintaining the wireless LAN device in the standby mode for a duration of the HT frame; and (d) if it is judged that the received HT frame is decodable by the wireless LAN device, maintaining the wireless LAN device in the reception mode, and decoding the HT frame at the wireless LAN device, wherein a PHY header of the HT frame comprises at least a legacy signal field (L-SIG field) and an HT signal field (HT-SIG field), and wherein the L-SIG field includes a RATE field for informing a legacy device of a transmission rate for the legacy device, and wherein the HT-SIG field includes a modulation coding scheme (MCS) field informing an HT device of the transmission characteristics of the HT frame, and an HT LENGTH field informing the HT device of size of a MAC protocol data unit (MPDU) of the HT frame.

2. The method of claim 1, wherein the L-SIG field includes a LENGTH field informing the legacy device of a size of a MAC protocol data unit (MPDU) of the HT frame.

3. The method of claim 1, wherein if the received HT flame is not decodable, the wireless LAN device is switched into the standby mode immediately after reading the HT-SIG filed.

4. The method of claim 1, wherein the duration is calculated by dividing a size recorded in the HT LENGTH field by a transmission rate indicated by an MCS index recorded in the MCS field.

5. The method of claim 1, wherein if the wireless LAN device is in a standby mode, the wireless LAN device consumes less than 5% of a maximum power.

6. The method of claim 1, further comprising (d) increasing a power to switch the standby mode into a reception mode for a specified time period before the expiration of the duration of the HT frame.

7. The method of claim 1, wherein (b) judges whether the HT frame is decodable according to a specified bit inserted into the HT frame.

8. The method of claim 1, wherein the at least one transmission characteristic of the HT frame comprises a number of antennas, a number of spatial streams, a modulation method, a coding rate and a transmission rate of the HT frame.

9. A method of reducing power consumption of a wireless local area network (LAN) device complying with the IEEE 802.1 in standard, the method comprising:

(a) receiving a high throughput (HT) frame complying with a TGnSync Alliance standard at the wireless LAN device while the wireless LAN device is in a reception mode;

(b) judging whether the received HT flame is decodable by the wireless LAN device based on whether the wireless LAN device supports at least one transmission characteristic of the HT flame;

(c) if it is judged that the received HT frame is not decodable by the wireless LAN device, judging whether a spoofing has occurred in the HT flame; and (d) if it is judged in (c) that the spoofing has occurred, switching the wireless LAN device into a standby mode from the reception mode, and maintaining the wireless LAN device in the standby mode for a legacy duration, wherein a PHY header of the HT frame comprises at least a legacy signal field (L-SIG field) and an HT signal field (HT-SIG field), and wherein the L-SIG field includes a RATE field for informing a legacy device of a transmission rate for the legacy device, and wherein the HT-SIG field includes a modulation coding scheme (MCS) field informing an HT device of the transmission characteristics of the HT frame, and an HT LENGTH field informing the HT device of the size of the (MPDU) of the HT frame.

10. The method of claim 9, further comprising (e) if it is judged from (b) that the HT frame is decodable, maintaining the wireless LAN device in the reception mode for the legacy duration, and decoding the HT frame at the wireless LAN device.

11. The method of claim 9, further comprising (e) if it is judged from (c) that no spoofing has occurred, switching the wireless LAN device into the standby mode, and maintaining the wireless LAN device in the standby mode for a duration of the HT frame.

12. The method of claim 9, wherein the L-SIG field includes a LENGTH field informing the legacy device of a size of a MAC protocol data unit (MPDU) of the HT frame.

13. The method of claim 12, wherein if the received HT frame is not decodable and the spoofing has occurred, the wireless LAN device is switched into the standby mode immediately after reading the L-SIG field and the HT-SIG filed.

14. The method of claim 12, wherein the duration of the HT frame is calculated by dividing a size value recorded in the HT LENGTH field by a transmission rate indicated by an MCS index recorded in the MCS field; and the legacy duration is calculated by dividing a size value recorded in the LENGTH field by a transmission rate indicated by an index recorded in the RATE field.

15. The method of claim 14, wherein whether the spoofing has occurred is judged depending on whether the duration of the HT frame is identical to the legacy duration.

16. The method of claim 9, wherein (b) and (c) judge whether the HT frame is decodable and whether the spoofing has occurred according to specified bits inserted into the HT frame, respectively.

17. The method of claim 9, wherein the at least one transmission characteristic of the HT frame comprises a number of antennas, a number of spatial streams, a modulation method, a coding rate and a transmission rate of the HT frame.

18. The method of claim 1, wherein, before the receiving the HT frame in the reception mode, the wireless LAN device has been in a listening mode in which the wireless LAN device consumes more power than in the standby mode.

19. The method of claim 9, wherein, before the receiving the HT frame in the reception mode, the wireless LAN device has been in a listening mode in which the wireless LAN device consumes more power than in the standby mode.

20. A wireless local area network (LAN) device complying with the IEEE 802.1 in standard, the wireless LAN device comprising:

a radio frequency (RF) unit which receives a high throughput (HT) frame complying with a TGnSync Alliance standard while the wireless LAN device is in a reception mode;

a decoding judgment unit which judges whether the received HT frame is decodable by the wireless LAN device based on whether the device supports at least one transmission characteristic of the HT frame;

a mode switching unit which switches the wireless LAN device into a standby mode from a reception mode if it judged that the received HT frame is not decodable by the wireless LAN device, and maintains the wireless LAN device in the standby mode for a duration of the HT frame, and if it is judged that the received HT frame is decodable by the wireless LAN device, maintains the wireless LAN device in the reception mode to decode the HT frame; and a power source which supplies a corresponding power depending on a mode of the mode switching unit, wherein a PHY header of the HT frame comprises at least a legacy signal field (L-SIG field) and an HT signal field (HT-SIG field), and wherein the L-SIG field includes a RATE field for informing a legacy device of a transmission rate for the legacy device, and wherein the HT-SIG field includes a modulation coding scheme (MCS) field informing an HT device of the transmission characteristics of the HT frame, and an HT LENGTH field informing the HT device of the size of the (MPDU) of the HT frame.

21. The wireless LAN device of claim 20, wherein the at least one transmission characteristic of the HT frame comprises a number of antennas, a number of spatial streams, a modulation method, a coding rate and a transmission rate of the HT frame.

22. The wireless LAN device of claim 20, wherein, before the receiving the HT frame in the reception mode, the wireless LAN device has been in a listening mode in which the wireless LAN device consumes more power than in the standby mode.

23. A wireless local area network (LAN) device complying with the IEEE 802.1 in standard, the wireless LAN device comprising:

a radio frequency (RF) unit which receives a high throughput (HT) frame complying with a TGnSync Alliance standard while the wireless LAN device is in a reception mode;

a decoding judgment unit which judges whether the received HT frame is decodable by the wireless LAN device based on whether the wireless LAN device supports at least one transmission characteristic of the HT frame;

a mode switching unit which judges whether a spoofing has occurred in the HT frame if it is judged that the received HT frame is not decodable by the wireless LAN device, and if it is judged that spoofing has occurred, switches the wireless LAN device into a standby mode from the reception mode, and maintains the wireless LAN device in the standby mode for a legacy duration; and power source which supplies a corresponding power depending on a mode of the mode switching unit, wherein a PHY header of the HT frame comprises at least a legacy signal field (L-SIG field) and an HT signal field (HT-SIG field), and wherein the L-SIG field includes a RATE field for informing a legacy device of a transmission rate for the legacy device, and wherein the HT-SIG field includes a modulation coding scheme (MCS) field informing an HT device of the transmission characteristics of the HT frame, and an HT LENGTH field informing the HT device of the size of the (MPDU) of the HT frame.

24. The wireless LAN device of claim 23, wherein the at least one transmission characteristic of the HT frame comprises a number of antennas, a number of spatial streams, a modulation method, a coding rate and a transmission rate of the HT frame.

25. The wireless LAN device of claim 23, wherein, before the receiving the HT frame in the reception mode, the wireless LAN device has been in a listening mode in which the wireless LAN device consumes more power than in the standby mode.

* * * * *